(12) United States Patent
Tang

(10) Patent No.: US 9,104,067 B2
(45) Date of Patent: Aug. 11, 2015

(54) BACKLIGHT MODULE AND LCD DEVICE COMPRISING BACKLIGHT MODULE

(75) Inventor: Guofu Tang, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 693 days.

(21) Appl. No.: 13/500,811

(22) PCT Filed: Mar. 19, 2012

(86) PCT No.: PCT/CN2012/072504
§ 371 (c)(1),
(2), (4) Date: Apr. 6, 2012

(87) PCT Pub. No.: WO2013/131288
PCT Pub. Date: Dec. 9, 2013

(65) Prior Publication Data
US 2013/0235295 A1 Sep. 12, 2013

(30) Foreign Application Priority Data
Mar. 7, 2012 (CN) .......................... 2012 1 0058365

(51) Int. Cl.
G02F 1/1335 (2006.01)
G02F 1/1333 (2006.01)

(52) U.S. Cl.
CPC .............. *G02F 1/133608* (2013.01); *G02F 2001/133322* (2013.01); *G02F 2001/133507* (2013.01); *G02F 2201/465* (2013.01)

(58) Field of Classification Search
CPC .............. G02F 1/133608; G02F 2001/133322; G02F 2201/465
See application file for complete search history.

(56) References Cited

U.S. PATENT DOCUMENTS 6,512,557 B1 * 1/2003 Miwa ............................... 349/58
2002/0080298 A1 * 6/2002 Fukayama ..................... 349/58
(Continued)

FOREIGN PATENT DOCUMENTS

CN 1731246 A 2/2006
CN 1760727 A 4/2006
(Continued)

OTHER PUBLICATIONS

Liang Lemin, the first office action, May 2013, CN.
(Continued)

*Primary Examiner* — Dennis Y Kim
(74) *Attorney, Agent, or Firm* — IPro, Inc.; Na Xu

(57) ABSTRACT

The invention relates to a backlight module and an LCD device comprising the backlight module. The backlight module includes a backplane, and an optical film arranged on the backplane; the optical film is provided with a convex lug for positioning, the convex lug is provided with a root and an expanded part which is outwards extended, and the width of the expanded part is more than that of the root; the side wall of the backplane is provided with first protrusion(s) which is provided with an opening, the root of the convex lug of the optical film is contained in the opening, the side wall of the backplane is further provided with second protrusion(s) which is provided with an extension part, and the expanded part of the convex lug of the optical film is contained below the extension part of the second protrusion. In the invention, the second protrusion is arranged on the backplane, and the extension part of the second protrusion can prevent the convex lug of the optical film from moving in the direction perpendicular to the plane of the optical film. The cost for arranging the second protrusion is low, and the installation means of the optical film has the advantages of simplicity, time saving, and labor saving.

18 Claims, 3 Drawing Sheets

(56) References Cited

U.S. PATENT DOCUMENTS

| | | |
|---|---|---|
| 2002/0125815 A1* | 9/2002 | Wakita .......................... 313/491 |
| 2003/0231499 A1* | 12/2003 | Kao ............................... 362/362 |
| 2005/0254261 A1 | 11/2005 | Lo et al. |
| 2007/0008449 A1* | 1/2007 | Choi ............................... 349/58 |
| 2007/0014078 A1 | 1/2007 | Cheng et al. |
| 2007/0279728 A1* | 12/2007 | Murakata ...................... 359/245 |
| 2008/0170416 A1* | 7/2008 | Yuan et al. .................... 362/633 |
| 2008/0291697 A1* | 11/2008 | Sun ............................... 362/628 |
| 2010/0007816 A1* | 1/2010 | Lee ................................. 349/58 |
| 2010/0289979 A1* | 11/2010 | Lee ................................. 349/58 |
| 2010/0328927 A1* | 12/2010 | Huang ......................... 362/97.1 |
| 2011/0304796 A1* | 12/2011 | Lee et al. ....................... 349/62 |
| 2012/0002130 A1* | 1/2012 | Watanabe ....................... 349/60 |

FOREIGN PATENT DOCUMENTS

| | | |
|---|---|---|
| CN | 1779516 A | 5/2006 |
| CN | 101266361 A | 9/2008 |
| CN | 101458419 A | 6/2009 |
| CN | 101510024 A | 8/2009 |
| CN | 101545601 A | 9/2009 |

OTHER PUBLICATIONS

Lin Bangyong, the International Searching Authority written comments, Dec. 2012, CN.

* cited by examiner

BACKLIGHT MODULE AND LCD DEVICE COMPRISING BACKLIGHT MODULE

TECHNICAL FIELD

The invention relates to the field of liquid crystal displays (LCDs), and more particularly to a backlight module and an LCD device comprising the backlight module.

BACKGROUND

An LCD device needs a backlight module and an LCD panel, and the backlight module needs some optical films which play the role of atomization, brightening, etc. Because the backlight module is vertically used in general, the aforementioned optical films are required to be positioned. For example, the China patent for invention whose patent number is 200410091576.X and whose title is combining structure of optical films and rubber frame mentions various positioning structures. In the prior art, the optical films are positioned on the rubber frame; because the optical films are thin in general and about 0.1-0.6 mm, in the backlight modules of small and medium size, the optical films are positioned by leaning. However, in the backlight modules of large size, because the size of the optical films is large, self weight deformation is produced among the optical films, the optical films cannot be positioned by leaning. In the prior art, the problem of self weight deformation of the optical films is solved by hanging position. Convex lugs of the optical films are drilled with holes, the optical films are directly hung on the rubber frame, but the size of the edges of the holes cannot be too small, otherwise there are difficulties in the process. The patent for invention further discloses a scheme of a convex lug arranged on one optical film, and the convex lug includes a root and an expanded part. The optical film is hung on a protrusion of the side wall of the rubber frame via the convex lug. The structure is suitable for a backlight module with a narrow frame. However, the above two positioning modes did not solve the positioning problem of the optical films in the direction perpendicular to the plane of the optical films, thereby possibly causing the warpage of the optical films. Under normal conditions, because of small deformation of the optical films in the backlight modules of small size, adhesive tapes can be employed to adhere the optical films to the rubber frame. However the adhering mode of adhesive tapes does not fit for the backlight modules of large size because the optical films have limited adhering positions, the adhering force of the adhesive tapes is inadequate, so that a certain hidden danger will exist. In the backlight modules of large size, elastic metal sheets are generally employed to clamp the optical films onto the rubber frame. However, the elastic metal sheets do not have the cost advantage because of high cost.

SUMMARY

In view of the above-described problems, the aim of the invention is to provide a backlight module and an LCD device thereof with advantages of simple structure, convenient assembly and low cost.

One aim of the invention is achieved by the following technical scheme. A backlight module comprises a backplane and an optical film arranged on the backplane; the optical film is provided with a convex lug for positioning, the convex lug is provided with a root and an expanded part which is outwards extended, and the width of the expanded part is more than that of the root. The side wall of the backplane is provided with first protrusion(s) which is provided with an opening, and the root of the convex lug of the optical film is contained in the opening. The side wall of the backplane is further provided with second protrusion(s) which is provided with an extension part, and the expanded part of the convex lug of the optical film is contained below the extension part of the second protrusion. The backplane is made of metal material, and the first protrusion and the second protrusion are integratedly punch formed together with the backplane. The root of the convex lug of the optical film corresponds to the shape of the opening of the first protrusion of the backplane, and the inside surface of the expanded part of the convex lug is matched with outside surface of the first protrusion. The convex lug of the optical film is positioned on one side of the optical film, the expanded part of the convex lug is extended to both sides in the direction parallel to the side, the second protrusions are positioned on both sides of the expanded part of the convex lug, and the distance between the second protrusions is less than the length of the expanded part of the convex lug. The convex lug of the optical film is in a trapezoid shape, the extension part of the second protrusion of the backplane is further provided with a chamfer for facilitating the expanded part of the convex lug of the optical film to enter, a groove is further provided below the extension part of the second protrusion of the backplane, the bottom of the groove is lower than that of the opening of the first protrusion, and the width of the groove is more than or equal to the width of the expanded part of the convex lug of the optical film.

The other aim of the invention is achieved by the following technical scheme. A backlight module comprises a backplane, and an optical film arranged on the backplane; the optical film is provided with a convex lug for positioning, the convex lug is provided with a root and an expanded part which is outwards extended, and the width of the expanded part is more than that of the root. The side wall of the backplane is provided with first protrusion(s) which is provided with an opening, and the root of the convex lug of the optical film is contained in the opening. The side wall of the backplane is further provided with second protrusion(s) which is provided with an extension part, and the expanded part of the convex lug of the optical film is contained below the extension part of the second protrusion.

Preferably, the backplane is made of metal material, and the first protrusion and the second protrusion are integratedly punch formed together with the backplane. Because of integrated forming, the cost of the backplane can be preferably controlled, and adding the first protrusion and the second protrusion basically cannot cause the cost to be significantly increased. Because the backplane is made of metal material, the first protrusion and the second protrusion have high structural strength, and can bear large deformation force, thereby preferably guaranteeing the positioning accuracy of the optical film.

Preferably, the root of the convex lug of the optical film corresponds to the shape of the opening of the first protrusion of the backplane, and the inside surface of the expanded part of the convex lug is matched with the outside surface of the first protrusion. Depending on the relationship that the root of the convex lug is matched with the opening of the first protrusion, and the inside surface of the expanded part of the convex lug is matched with the outside surface of the first protrusion, the optical film is positioned in the directions of both length and width, namely the optical film will not be moved in the plane direction thereof.

Preferably, The convex lug of the optical film is positioned on one side of the optical film, and the expanded part of the convex lug is extended to both sides in the direction parallel to the side; the second protrusions are positioned on both sides of the expanded part of the convex lug, and the distance between the second protrusions is less than the length of the expanded part of the convex lug.

Preferably, the convex lug of the optical film is positioned on one side of the optical film, and the expanded part of the convex lug is extended to one side in the direction parallel to the side.

Preferably, the convex lug is arranged at one corner of the optical film, the expanded part of the convex lug is extended in the direction of the two sides of the corner, and the second protrusion of the backplane and the extension part thereof are positioned on the two side walls of the corner.

Preferably, the convex lug of the optical film is in a trapezoid shape. The whole side of the trapezoid convex lug can be stressed, thereby having better stress condition and better positioning correction capacity than that of the T-shaped convex lug.

Preferably, the extension part of the second protrusion of the backplane is further provided with a chamfer for facilitating the expanded part of the convex lug of the optical film to enter. The chamfer can facilitate the successful installation of the optical film, and reduce the bent and deformed probability of the expanded part of the convex lug, to increase the yield rate.

Preferably, a groove is further provided below the extension part of the second protrusion of the backplane, the bottom of the groove is lower than that of the opening of the first protrusion, and the width of the groove is more than or equal to that of the expanded part of the convex lug of the optical film. The groove is mainly used for providing deformation space for the expanded part of the convex lug when the number of optical films is multiple, so that the expanded part successfully enters below the extension part of the second protrusion.

The invention further provides an LCD device, comprising a backlight module; the backlight modules comprises a backplane, and an optical film arranged on the backplane; the optical film is provided with a convex lug for positioning, the convex lug is provided with a root and an expanded part which is outwards extended, and the width of the extended part is more than that of the root; the side wall of the backplane is provided with first protrusion(s) which is provided with an opening, and the root of the convex lug of the optical film is contained in the opening; the side wall of the backplane is further provided with second protrusion(s) which is provided with an extension part, and the expanded part of the convex lug of the optical film is contained below the extension part of the second protrusion.

Preferably, the backplane is made of metal material, and the first protrusion and the second protrusion are integratedly punch formed together with the backplane.

Preferably, the root of the convex lug of the optical film corresponds to the shape of the opening of the first protrusion of the backplane, and the inside surface of the extended part of the convex lug is matched with the outside surface of the first protrusion.

Preferably, the convex lug of the optical film is positioned on one side of the optical film, the expanded part of the convex lug is extended to both sides in the direction parallel to the side, the second protrusions are positioned on both sides of the expanded part of the convex lug, and the distance between the second protrusions is less than the length of the expanded part of the convex lug.

Preferably, the convex lug of the optical film is positioned on one side of the optical film, and the expanded part of the convex lug is extended to one side in the direction parallel to the side.

Preferably, the convex lug is arranged at one corner of the optical film, the expanded part of the convex lug is extended in the direction of the two sides of the corner, and the second protrusion of the backplane and the extension part thereof are positioned on the two side walls of the corner.

Preferably, the convex lug of the optical film is in a trapezoid shape.

Preferably, the extension part of the second protrusion of the backplane is further provided with a chamfer for facilitating the expanded part of the convex lug to enter.

Preferably, a groove is further provided below the extension part of the second protrusion of the backplane, the bottom of the groove is lower than that of the opening of the first protrusion, and the width of the groove is more than or equal to that of the expanded part of the convex lug of the optical film.

Advantages of the invention are summarized below: when the optical film of the backlight module of the invention is assembled, the root of the convex lug of the optical film is aligned with the opening of the first protrusion of the backplane, and then the expanded part of the convex lug is downwards pressed. Because some interference exists between the expanded part and the extension part of the second protrusion of the backplane, but the optical film is thin and has elasticity, the expanded part is deformed with slight force, thereby pushing the expanded part below the extension part of the second protrusion, and the deformation is restored after the expanded part penetrates through the extension part of the second protrusion. At this moment, the root of the convex lug of the optical film enters the opening of the first protrusion of the backplane, the optical film is positioned in the plane directions of length and width by the convex lug, and the optical film is positioned in the direction perpendicular to the plane thereof by the extension part of the second protrusion.

The optical film of the backlight module of the invention is positioned on the backplane rather than on the rubber frame in the prior art, and the backplane is provided with an optical film bearing surface which can be a light guide panel surface; thus, installation can be facilitated, and the bent and deformed probability of the optical film can be reduced in positioning; in addition, optical experiments show that the luminance will be declined if the base material (PET in general) of the optical film is not tightly attached to the backplane. The optical film of the invention is positioned on the backplane, so that the optical film is tightly attached to the light guide panel, and the luminance of the backlight module is increased as compared with the prior art. In the invention, the second protrusion is arranged on the backplane instead of using adhesive tapes or an elastic metal sheets to position the optical film in the direction perpendicular to the plane thereof, the extension part of the second protrusion can prevent the convex lug of the optical film from moving in the direction perpendicular to the plane of the optical film. The cost for arranging the second protrusion is low, and the installation means of the optical film has the advantages of simplicity, time saving, labor saving, and reliable positioning, and is suitable for the backlight modules of all size, particularly the backlight modules of large size.

Wherein: 1 optical film; 11. convex lug; 111. root; 112. expanded part; 2. backplane; 21. first protrusion; 211. opening; 22. second protrusion; 221. extension part; 222. chamfer; 23. groove.

DETAILED DESCRIPTION

Figure 1:
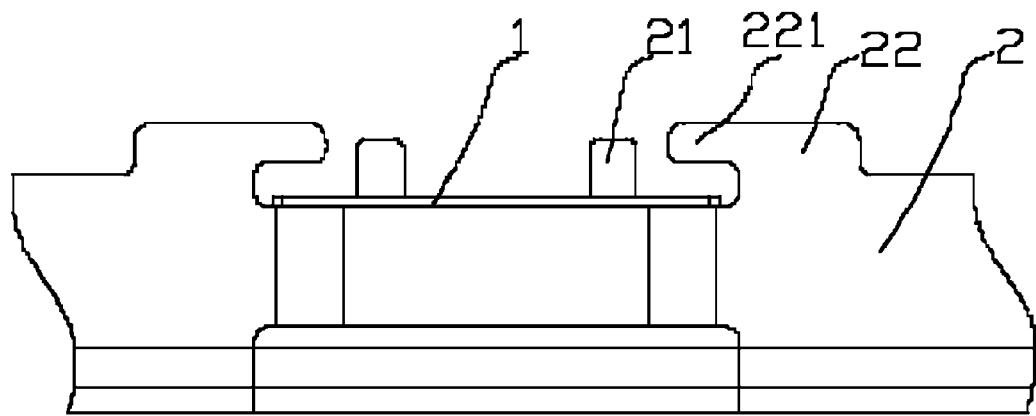
FIG. 1 is a partial front view of a first example of a backlight module of the invention.
Figure 2:
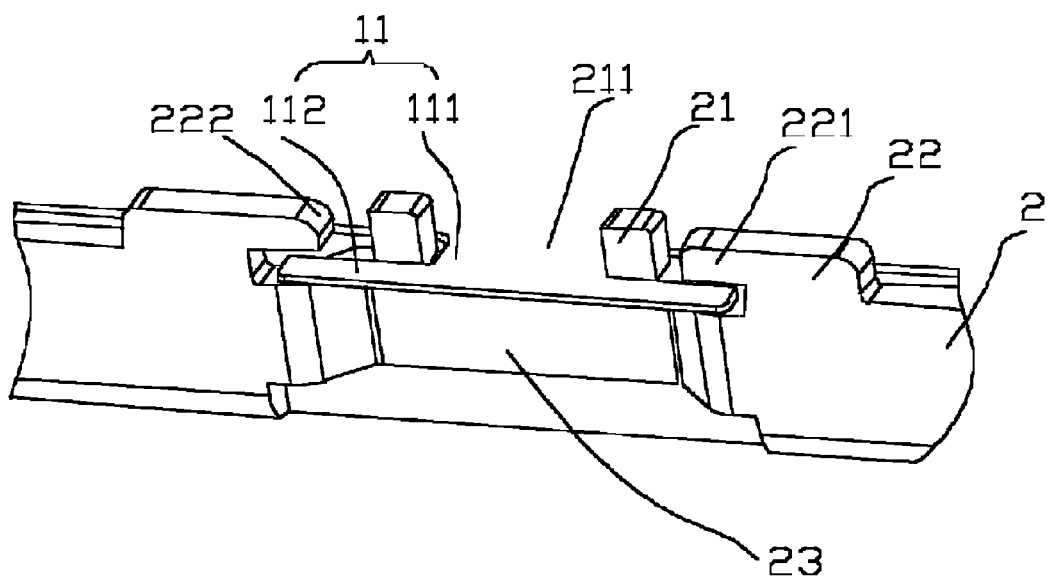
FIG. 2 is a partial three-dimensional view of a first example of a backlight module of the invention.
Figure 3:
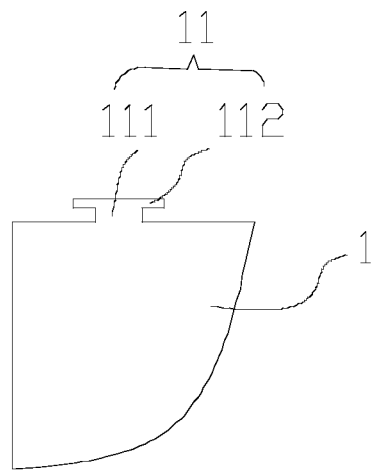
FIG. 3 is a plan view of an optical film of a first example of a backlight module of the invention.

The invention provides an LCD device comprising a backlight module used as an example of the backlight module of the invention; as shown in FIG. 1-3, the backlight module comprises a backplane 2, and an optical film 1 arranged on the backplane 2; the optical film 1 is provided with a convex lug 11 for positioning, the convex lug 11 is provided with a root 111 and an expanded part 112 which is outwards extended, and the width of the extended part 112 is more than that of the root 111; the side wall of the backplane 2 is provided with first protrusion(s) 21 which is provided with an opening 211, the root 111 of the convex lug 11 of the optical film 1 is contained in the opening 211, the side wall of the backplane 2 is further provided with second protrusion(s) 22 which is provided with an extension part 221, and the expanded part 112 of the convex lug 11 of the optical film 1 is contained below the extension part 221 of the second protrusion 22.

In the example, the backplane 2 is made of metal material; the first protrusion 21 and the second protrusion 22 are integratedly punch formed together with the backplane 2 so that the cost of the backplane 2 can be preferably controlled, and adding the first protrusion 21 and the second protrusion 22 basically cannot cause the cost to be significantly increased. Because the backplane 2 is made of metal material, the first protrusion 21 and the second protrusion 22 have high structural strength, and can bear large deformation force, thereby preferably guaranteeing the positioning accuracy of the optical film 1.

In the example, the convex lug 11 of the optical film 1 is positioned on one side of the optical film 1, the expanded part 112 of the convex lug 11 is extended to both sides in the direction parallel to the side, the convex lug 11 is nearly in a T shape, the extension parts 221 of the second protrusions are positioned on both sides of the expanded part 112 of the convex lug, and the distance between the extension parts of the second protrusions is less than the length of the expanded part 112 of the convex lug, thereby limiting the expanded part 112 of the convex lug below the extension parts 221 of the second protrusions.

In the example, the root 111 of the convex lug 11 of the optical film corresponds to the shape of the opening 211 of the first protrusion 21 of the backplane 2, and the inside surface of the expanded part 112 of the convex lug is matched with the outside surface of the first protrusion 21. Depending on the relationship that the root 111 of the convex lug 11 is matched with the opening 211 of the first protrusion 21, and the inside surface of the expanded part 112 of the convex lug 11 is matched with the outside surface of the first protrusion 21, the optical film 1 is positioned in the directions of both length and width, namely the optical film 1 will not be moved in the plane direction thereof.

When the optical film 1 of the backlight module of the invention is assembled, the root 111 of the convex lug of the optical film 1 is aligned with the opening 211 of the first protrusion 21 of the backplane, and then the expanded part 112 of the convex lug is downwards pressed. Because some interference exists between the expanded part 112 and the extension part 221 of the second protrusion of the backplane 2, but the optical film 1 is thin and has elasticity, the expanded part 112 is deformed with slight force, thereby pushing the expanded part 112 below the extension part 221 of the second protrusion, the deformation is restored after the expanded part 112 penetrates through the extension part of the second protrusion. At this moment, the root 111 of the convex lug of the optical film enters the opening 211 of the first protrusion of the backplane, the optical film 1 is positioned in the plane directions of length and width by the convex lug 11, and the optical film 1 is positioned in the direction perpendicular to the plane thereof by the extension part 221 of the second protrusion.

The optical film 1 of the backlight module of the invention is positioned on the backplane 2 rather than on the rubber frame in the prior art, and the backplane 2 is provided with an optical film bearing surface which can be a light guide panel surface; thus, installation can be can facilitated, and the bent and deformed probability of the optical film can be reduced in positioning; in addition, optical experiments show that the luminance will be declined if the base material (PET in general) of the optical film 1 is not tightly attached to the backplane 2. The optical film 1 of the invention is positioned on the backplane 2, so that the optical film 1 is tightly attached to the light guide panel, and the luminance of the backlight module is increased as compared with the prior art. In the invention, the second protrusion 22 is arranged on the backplane 2 instead of using adhesive tapes or elastic metal sheets to position the optical film in the direction perpendicular to the plane thereof, and the extension part 221 of the second protrusion can prevent the convex lug 11 of the optical film from moving in the direction perpendicular to the plane of the optical film. The cost for arranging the second protrusion 22 is low, the installation means of the optical film 1 has the advantages of simplicity, time saving, labor saving, and reliable positioning, and is suitable for the backlight modules of all size, particularly the backlight modules of large size.

In the example, the extension part 221 of the second protrusion of the backplane is further provided with a chamfer 222 for facilitating the expanded part 112 of the convex lug of the optical film to enter. The chamfer 222 can facilitate the successful installation of the optical film 1, and reduce the bent and deformed probability of the extended part 112 of the convex lug, to increase the yield rate.

In the example, a groove 23 is further provided below the lower part of the extension part 221 of the second protrusion of the backplane, the bottom of the groove 23 is lower than that of the opening 211 of the first protrusion, and the width of the groove 23 is more than or equal to that of the expanded part 112 of the convex lug of the optical film. The groove 23 is mainly used for providing deformation space for the expanded part 112 of the convex lug when the number of the optical films 1 is multiple, so that the expanded part 112 successfully enters below the extension part 221 of the second protrusion.

Figure 4:
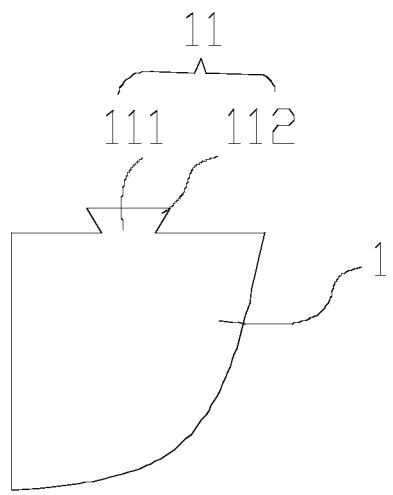
FIG. 4 is a plan view of an optical film with a convex lug in a trapezoid shape.

In the aforementioned example, the convex lug 11 of the optical film can also be in a trapezoid shape, as shown in FIG. 4, the convex lug 11 of the optical film further comprises a root 111 and an expanded part 112, and the whole side of the trapezoid convex lug can be stressed, thereby having better stress condition, and better positioning correction capacity than that of the T-shaped convex lug.

Figure 5:
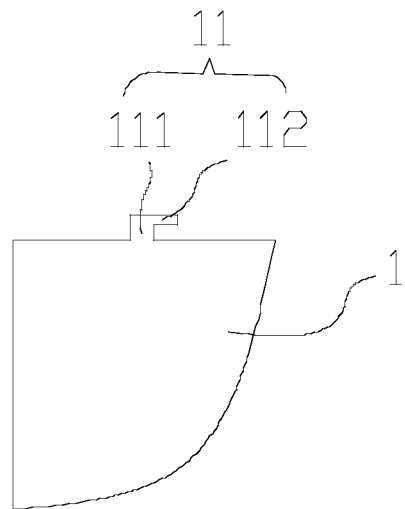
FIG. 5 is a plan view of an optical film with a convex lug extended to one side of a backlight module of the invention.

The convex lug 11 of the optical film 1 of the backlight module of the invention can also be positioned on one side of the optical film 1, and the expanded part 112 of the convex lug is extended to one side in the direction parallel to the side. As shown in FIG. 5, the aforementioned beneficial effect can be achieved as long as the extension part of the second protrusion of the backplane is extended to one direction.

Figure 6:
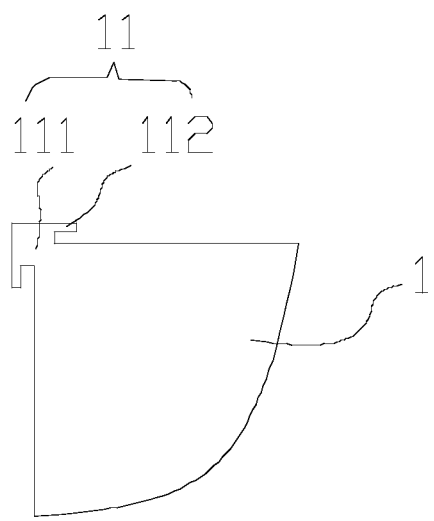
FIG. 6 is a plan view of an optical film with a convex lug positioned at a corner of a backlight module of the invention.

The convex lug 11 of the optical film 1 of the backlight module of the invention can also be arranged at one corner of the optical film 1; as shown in FIG. 6, the expanded part 112 of the convex lug is extended in the direction of the two sides of the corner, and the second protrusion of the backplane and the extension part thereof are positioned on the two side walls of the corner. Similarly, the convex lug is matched with the first protrusion, so that the optical film is positioned in the plane direction thereof, and the expanded part of the convex lug is matched with the extension part of the second protrusion, so that the optical film is positioned in the direction perpendicular to the plane thereof, thereby achieving the beneficial effect of the aforementioned example.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

I claim:

1. A backlight module, comprising a backplane, and an optical film arranged on the backplane; said optical film is provided with a convex lug for positioning, said convex lug is provided with a root and an expanded part which is outwards extended, and the width of said expanded part is more than that of said root; the side wall of said backplane is provided with a first protrusion which is provided with an opening, the root of the convex lug of said optical film is contained in the opening, the side wall of said backplane is further provided with two second protrusions each of which is provided with an extension part, and the expanded part of the convex lug of said optical film is contained below the extension part of each second protrusion; said backplane is made of metal material, and the first protrusion and the two second protrusions are integrally punch formed together with the backplane; the root of the convex lug of said optical film corresponds to the shape of the opening of the first protrusion of said backplane, the inside surface of the expanded part of the convex lug is matched with the outside surface of the first protrusion, the convex lug of said optical film is positioned on one side of said optical film, and the expanded part of the convex lug is extended to both sides in the direction parallel to the side; said two second protrusions are positioned on both sides of the expanded part of the convex lug, and the distance between the two second protrusions is less than the length of the expanded part of the convex lug; the convex lug of said optical film is in a trapezoid shape, the extension part of each second protrusion of said backplane is further provided with a chamfer for facilitating the expanded part of the convex lug of the optical film to enter, a groove is further provided below the extension part of each second protrusion of said backplane, the bottom of the groove is lower than that of the opening of the first protrusion, and the width of the groove is more than or equal to that of the expanded part of the convex lug of the optical film.

2. A backlight module, comprising a backplane, and an optical film arranged on the backplane; said optical film is provided with a convex lug for positioning, said convex lug is provided with a root and an expanded part which is outwards extended, and the width of said expanded part is more than that of said root; the side wall of said backplane is provided with a first protrusion which is provided with an opening, the root of the convex lug of said optical film is contained in the opening, the side wall of the backplane is further provided with at least one second protrusion which is provided with an extension part, and the expanded part of the convex lug of the optical film is contained below the extension part of the at least one second protrusion; and
wherein a groove is further provided below the extension part of the at least one second protrusion of said backplane, the bottom of the groove is lower than that of the opening of the first protrusion, and the width of the groove is more than or equal to that of the expanded part of the convex lug of the optical film.

3. The backlight module of claim 2, wherein said backplane is made of metal material, and the first protrusion and the at least one second protrusion are integrally punch formed together with the backplane.

4. The backlight module of claim 2, wherein the root of the convex lug of said optical film corresponds to the shape of the opening of the first protrusion of said backplane, and the inside surface of the expanded part of the convex lug is matched with the outside surface of the first protrusion.

5. The backlight module of claim 2, wherein the side wall of the backplane is provided with two second protrusions, the convex lug of said optical film is positioned on one side of said optical film, and the expanded part of the convex lug is extended to both sides in the direction parallel to the side; said two second protrusions are positioned on both sides of the expanded part of the convex lug, and the distance between said two second protrusions is less than the length of the expanded part of the convex lug.

6. The backlight module of claim 2, wherein the convex lug of said optical film is positioned on one side of said optical film, and the expanded part of the convex lug is extended to one side in the direction parallel to the side.

7. The backlight module of claim 2, wherein the side wall of the backplane is provided with two second protrusions, said convex lug is arranged at one corner of the optical film, the expanded part of said convex lug is extended in the direction of the two sides of the corner, and the two second protrusions of said backplane and the extension parts thereof are positioned on the two side walls of the corner.

8. The backlight module of claim 2, wherein the convex lug of said optical film is in a trapezoid shape.

9. The backlight module of claim 2, wherein the extension part of the at least one second protrusion of said backplane is further provided with a chamfer for facilitating the expanded part of the convex lug of the optical film to enter.

10. The backlight module of claim 2, wherein the first protrusion directly extends from a top of the sidewall, the at least one second protrusion also directly extends from the top of the sidewall, and the at least one second protrusion is apart from the first protrusion.

11. An LCD device, comprising a backlight module; said backlight module comprises a backplane, and an optical film arranged on the backplane; said optical film is provided with a convex lug for positioning, said convex lug is provided with a root and an expanded part which is outwards extended, and the width of said expanded part is more than that of said root; the side wall of said backplane is provided with a first protrusion which is provided with an opening, the root of the convex lug of said optical film is contained in the opening, the side wall of the backplane is further provided with at least one second protrusion which is provided with an extension part, and the expanded part of the convex lug of the optical film is contained below the extension part of the at least one second protrusion; and wherein a groove is further provided below the extension part of the at least one second protrusion of said backplane, the bottom of the groove is lower than that of the opening of the first protrusion, and the width of the groove is more than or equal to that of the expanded part of the convex lug of the optical film.

12. The LCD device of claim 11, wherein said backplane is made of metal material, and the first protrusion and the at least one second protrusion are integrally punch formed together with said backplane.

13. The LCD device of claim 11, wherein the root of the convex lug of said optical film corresponds to the shape of the opening of the first protrusion of the backplane, and the inside surface of the expanded part of the convex lug is matched with the outside surface of the first protrusion.

14. The LCD device of claim 11, wherein the side wall of the backplane is provided with two second protrusions, the convex lug of said optical film is positioned on one side of said optical film, the expanded part of the convex lug is extended to both sides in the direction parallel to the side, said two second protrusions are positioned on both sides of the expanded part of the convex lug, and the distance between said two second protrusions is less than the length of the expanded part of the convex lug.

15. The LCD device of claim 11, wherein the convex lug of said optical film is positioned on one side of said optical film, and the expanded part of the convex lug is extended to one side in the direction parallel to the side.

16. The LCD device of claim 11, wherein the side wall of the backplane is provided with two second protrusions, said convex lug is arranged at one corner of the optical film, the expanded part of said convex lug is extended in the direction of the two sides of the corner, and the two second protrusions of said backplane and the extension parts thereof are positioned on the two side walls of the corner.

17. The LCD device of claim 11, wherein the convex lug of said optical film is in a trapezoid shape.

18. The LCD device of claim 11, wherein the extension part of the at least one second protrusion of said backplane is also provided with a chamfer for facilitating the expanded part of the convex lug of the optical film to enter.

\* \* \* \* \*